(12) United States Patent
Border

(10) Patent No.: US 11,451,320 B2
(45) Date of Patent: *Sep. 20, 2022

(54) ON-THE-FLY INROUTE ADAPTIVE MODULATION

(71) Applicant: Hughes Network Systems, LLC, Germantown, MD (US)

(72) Inventor: John Border, Middletown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/144,752

(22) Filed: Jan. 8, 2021

(65) Prior Publication Data
US 2021/0135777 A1 May 6, 2021

Related U.S. Application Data

(63) Continuation of application No. 16/523,367, filed on Jul. 26, 2019, now Pat. No. 10,924,203.

(51) Int. Cl.
*H04L 1/00* (2006.01)
*H04B 7/185* (2006.01)
*H04L 27/00* (2006.01)

(52) U.S. Cl.
CPC ....... *H04L 1/0003* (2013.01); *H04B 7/18519* (2013.01); *H04L 1/0009* (2013.01); *H04L 27/0008* (2013.01)

(58) Field of Classification Search
None
See application file for complete search history.

(56) References Cited

U.S. PATENT DOCUMENTS

| 7,724,698 | B2 | 5/2010 | Morris et al. |
| 8,285,202 | B2 * | 10/2012 | Miller ............... H04B 7/2041 455/12.1 |
| 9,941,952 | B2 | 4/2018 | Antia et al. |
| 10,708,112 | B2 | 7/2020 | Nammi et al. |
| 10,797,784 | B2 | 10/2020 | Hreha et al. |
| 2003/0040274 | A1 | 2/2003 | Dai et al. |
| 2003/0129943 | A1 | 7/2003 | Park et al. |
| 2003/0174759 | A1 | 9/2003 | Miyoshi |
| 2003/0231706 | A1 | 12/2003 | Hwang |

(Continued)

OTHER PUBLICATIONS

International Search Report and Written Opinion for PCT/US2020/042874 dated Oct. 30, 2020, all pages.

(Continued)

*Primary Examiner* — Jamaal Henson
(74) *Attorney, Agent, or Firm* — Kilpatrick Townsend & Stockton, LLP

(57) ABSTRACT

Various arrangements for adaptive modulation of terminal to satellite communications are presented herein. A terminal may access a feedback data structure to perform a lookup based on a power level received as feedback. Based on performing the lookup using the power level in the feedback data structure, the terminal may determine an error correcting code rate to be used. The terminal may transmit one or more data packets to the satellite using the determined error correcting code rate without changing communication channel or requesting permission via the satellite to change the error correcting code rate.

15 Claims, 5 Drawing Sheets

(56) References Cited

U.S. PATENT DOCUMENTS

| | | |
|---|---|---|
| 2004/0022177 A1 | 2/2004 | Awad et al. |
| 2005/0064890 A1 | 3/2005 | Johan et al. |
| 2005/0118959 A1 | 6/2005 | Johan et al. |
| 2005/0208973 A1 | 9/2005 | Iochi |
| 2006/0023717 A1* | 2/2006 | Trachtman ............ H04L 1/0009 370/392 |
| 2008/0274690 A1 | 11/2008 | Laufer |
| 2009/0052512 A1 | 2/2009 | Kim et al. |
| 2010/0048236 A1 | 2/2010 | Higuchi et al. |
| 2010/0260043 A1 | 10/2010 | Kimmich et al. |
| 2010/0260259 A1 | 10/2010 | Kimmich et al. |
| 2011/0021137 A1 | 1/2011 | Laufer |
| 2011/0149836 A1 | 6/2011 | Hong et al. |
| 2014/0328155 A1 | 11/2014 | Dhanda et al. |
| 2014/0362802 A1 | 12/2014 | Jitsukawa |
| 2015/0139072 A1 | 5/2015 | Hong et al. |
| 2016/0037434 A1 | 2/2016 | Gopal et al. |
| 2016/0127060 A1 | 5/2016 | Cross |
| 2016/0277096 A1 | 9/2016 | Wu et al. |
| 2018/0102949 A1* | 4/2018 | Smith .................. H04L 1/0009 |
| 2018/0183545 A1 | 6/2018 | Subramaniam et al. |
| 2019/0007129 A1* | 1/2019 | Vargas ............... H04B 7/18586 |
| 2019/0009129 A1* | 1/2019 | Liao Lai .......... A63B 23/03591 |
| 2019/0132044 A1 | 5/2019 | Hreha et al. |

OTHER PUBLICATIONS

Tato et al., "Link Adaptation in Mobile Satellite Links: Field Trials Results", 8th Advanced Satellite Multimedia Systems Conference and the 14th Signal Processing for Space Communications Workshop (ASMS/SPSC), Available Online at http://gpsc.uvigo.es/sites/default/files/publications/1570276720_1.pdf, Sep. 5, 2016, pp. 1-8.

* cited by examiner

Sorted by Bytes/Throughput per Slot

Symbol Rate: 512 ksps
Maximum Burst Size (bytes): 1566

| Modulation | Bits per Symbol | Code Rate | Bytes per Slot | Maximum Burst Size (slots) | Throughput per Slot (bps) | AIS Ordering | Carrier to Noise Ratio |
|---|---|---|---|---|---|---|---|
| 16APSK | 4 | 9/10 | 54 | 29 | 9600 | 1 | 75.0 |
| 16ASPK | 4 | 4/5 | 48 | 32 | 8533 | 2 | 72.4 |
| 16ASPK | 4 | 2/3 | 40 | 39 | 7111 | 3 | 70.4 |
| 8PSK | 3 | 8/9 | 40 | 39 | 7111 | Note 1 | 70.0 |
| 8PSK | 3 | 4/5 | 36 | 43 | 6400 | 4 | 69.3 |
| 8PSK | 3 | 2/3 | 30 | 52 | 5333 | 5 | 68.2 |
| 16APSK | 4 | 1/2 | 30 | 52 | 5333 | Note 1 | 67.5 |
| QPSK | 2 | 9/10 | 27 | 58 | 4800 | 6 | 66.1 |
| QPSK | 2 | 4/5 | 24 | 65 | 4267 | 7 | 65.2 |
| 8PSK | 3 | 1/2 | 22.5 | 69 | 4000 | Note 1 | 64.6 |
| QPSK | 2 | 2/3 | 20 | 78 | 3556 | 8 | 62.8 |
| QPSK | 2 | 1/2 | 15 | 104 | 2667 | 9 | 61.0 |

FIG. 3

ON-THE-FLY INROUTE ADAPTIVE MODULATION

CROSS-REFERENCES TO RELATED APPLICATIONS

This application is a continuation of U.S. patent application Ser. No. 16/523,367, filed on Jul. 26, 2019, entitled "On-The-Fly Inroute Adaptive Modulation," the disclosure of which is hereby incorporated by reference in their entirety for all purposes.

BACKGROUND

The conditions on a return communication channel (aka an inroute) between a terminal and a satellite can change over time. Effects such as antenna alignment, interference, satellite position, terminal position, weather, obstructions, and distance can affect the amount of signal strength received by the satellite from the terminal. Depending on the current return communication channel conditions, the forward error correcting code rate, type of modulation, or both can be adjusted to either take advantage of improved channel conditions (e.g., increase the data throughput) or to compensate for degraded channel conditions.

SUMMARY

Various embodiments are described related to a method for adaptive modulation of terminal to satellite communications. In some embodiments, a method for adaptive modulation of terminal to satellite communications is described. The method may include receiving, by a terminal, power level feedback from a satellite. The power level feedback may be indicative of a received power level of a data transmission previously sent from the terminal to the satellite. The method may include accessing, by the terminal, a feedback data structure to perform a lookup based on the received power level. The feedback data structure maps a plurality of types of modulation with a plurality of minimum power level thresholds. The method may include, based on performing the lookup based on the received power level in the feedback data structure, determining, by the terminal, a type of modulation from the plurality of types of modulation. The method may include transmitting, by the terminal, data packets to the satellite using the determined type of modulation without changing communication channel or requesting permission via the satellite to change modulation. The type of modulation may differ from a previous type of modulation used to transmit the data transmission previously sent from the terminal to the satellite.

Embodiments of such a method may include one or more of the following features: the feedback data structure further maps the plurality of minimum power level thresholds to a plurality of error correcting code rates. The feedback data structure may include a plurality of entries. Each entry of the plurality of entries maps one of the plurality of types of modulation with one of the plurality of error correcting code rates and one of the plurality of minimum power level thresholds. The plurality of entries of the feedback data structure may be ranked according to the plurality of minimum power level thresholds. Determining the type of modulation may further include determining, by the terminal, an error correcting code rate from the plurality of error correcting code rates. Determining the type of modulation may further include selecting, by the terminal, an entry from the plurality of entries based on the power level feedback being greater than a first minimum power level threshold of the entry but the power level feedback being less than a second minimum power level threshold of a next higher ranked entry. The plurality of entries may be interspersed such that one type of modulation of the plurality of types of modulation may be mapped to a first entry having a higher rank than a second entry mapped to a second type of modulation of the plurality of types of modulation and the one type of modulation may be mapped to a third entry having a lower rank than the second entry mapped to the second type of modulation. The method may further include, prior to transmitting data packets to the satellite using the determined type of modulation, transmitting, by the terminal, a burst packet header that may indicate the type of modulation. The burst packet header may be transmitted using a fixed modulation and fixed code rate that may be unchanging in relation to the determined type of modulation. The method may further include encoding, by a modulator integrated circuit of the terminal, the data packets to the satellite using the determined type of modulation. The method may further include receiving, by the terminal, a second power level feedback from the satellite. The second power level feedback may be indicative of a second received power level of a second data transmission previously sent from the terminal to the satellite. The method may further include accessing, by the terminal, the feedback data structure to perform a second lookup based on the second received power level. The method may further include, based on performing the second lookup based on the second received power level in the feedback data structure, determining, by the terminal, the second power level feedback may not be greater than any of the plurality of minimum power level thresholds. Each of the plurality of minimum power level thresholds may be mapped to a same symbol rate. The method may further include determining, by the terminal, to decrease a symbol rate in response to determining that the second power level feedback may not be greater than any of the plurality of minimum power level thresholds. The method may further include transmitting, by the terminal to the satellite, a request to change a symbol rate on a channel designated for aloha random access.

In some embodiments, a system that performs adaptive modulation of terminal to satellite communications is described. The system may include a terminal that may be in communication with a gateway system via a satellite and a satellite antenna. The terminal may include one or more non-transitory processor-readable mediums and the terminal may be configured to receive power level feedback from the satellite. The power level feedback may be indicative of a received power level of a data transmission previously sent from the terminal to the satellite. The terminal may be configured to access a feedback data structure stored using the one or more non-transitory processor-readable mediums to perform a lookup based on the received power level. The feedback data structure may map a plurality of types of modulation with a plurality of minimum power level thresholds. The terminal may be configured to, based on performing the lookup based on the received power level in the feedback data structure, determine a type of modulation from the plurality of types of modulation. The terminal may be configured to transmit data packets to the satellite using the determined type of modulation without changing communication channel or requesting permission via the satellite to change modulation. The type of modulation differs from a previous type of modulation used to transmit the data transmission previously sent from the terminal to the satellite.

Embodiments of such a system may include one or more of the following features: the terminal may be electrically connected with the satellite antenna and the satellite antenna may receive and transmit data to the satellite. The satellite may relay communications between the terminal and the gateway system. The gateway system may determine the power level feedback and transmit the power level feedback to the satellite. The feedback data structure may map the plurality of minimum power level thresholds to a plurality of error correcting code rates. The feedback data structure may include a plurality of entries. Each entry of the plurality of entries may map one of the plurality of types of modulation with one of the plurality of error correcting code rates and one of the plurality of minimum power level thresholds. The plurality of entries of the feedback data structure may be ranked according to the plurality of minimum power level thresholds. The terminal being configured to determine the type of modulation may include the terminal being configured to determine an error correcting code rate from the plurality of error correcting code rates. The terminal may be configured to select an entry from the plurality of entries based on the power level feedback being greater than a first minimum power level threshold of the entry but the power level feedback being less than a second minimum power level threshold of a next higher ranked entry. The plurality of entries may be interspersed such that one type of modulation of the plurality of types of modulation may be mapped to a first entry having a higher rank than a second entry mapped to a second type of modulation of the plurality of types of modulation and the one type of modulation may be mapped to a third entry having a lower rank than the second entry mapped to the second type of modulation. The terminal may be further configured to transmit a burst packet header that may indicate the type of modulation prior to transmitting data packets to the satellite using the determined type of modulation. The burst packet header may be transmitted using a fixed modulation and fixed code rate that may be unchanging in relation to the determined type of modulation.

BRIEF DESCRIPTION OF THE DRAWINGS

A further understanding of the nature and advantages of various embodiments may be realized by reference to the following figures.

FIG. 3 illustrates an embodiment of a lookup table stored by the terminal to select a type of modulation, an error-correcting coding rate, or both.

DETAILED DESCRIPTION

For communication from a terminal to a satellite, a modulation and error coding rate may be selected based on the signal strength (e.g., carrier to noise ratio) received by the satellite. The gateway system in communication with the satellite may relay a power level feedback measurement to the terminal. The terminal may use the power level feedback measurement to determine how to modify its transmissions to compensate for the current return channel conditions.

Depending on the power level received by the satellite from the terminal, certain combinations of modulations and error correcting rates may be the most efficient combination given the signal strength received by the satellite. As the received power level changes, the modulation, error correcting rate, or both may be changed to compensate for return channel conditions. The terminal can have a stored data arrangement which can be queried based on the received power level. The terminal may use an on-the-fly messaging arrangement in order to switch modulation on data signals sent via the return channel without requesting to change the modulation. Therefore, without sending a request to the satellite or the gateway or changing the channel of communication, the terminal may change the modulation used for return channel communications to the gateway system via the satellite. Additionally, the terminal may change the error coding rate based on the condition of the return channel without requesting such a change to the gateway system. Accordingly, the terminal can unilaterally determine to change type of modulation, error correcting code rate, or both and continue communicating with the satellite on a same channel.

Figure 1:
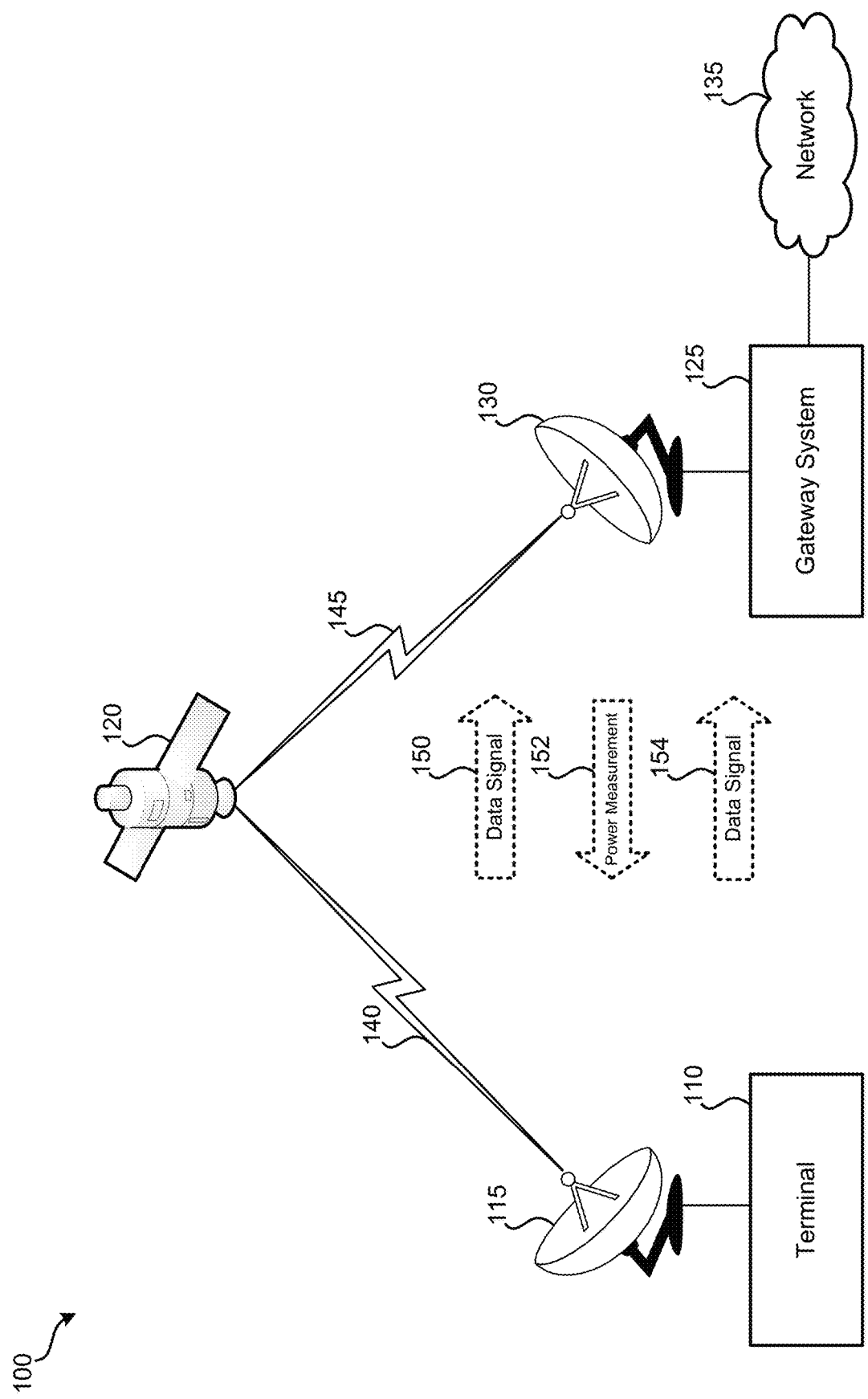
FIG. 1 illustrates an embodiment of a system for communication between a terminal and a gateway via satellite.

Further detail is provided regarding embodiments of the invention in relation to the figures. FIG. 1 illustrates an embodiment of a system 100 for communication between a terminal and a gateway via satellite. System 100 can include: terminal 110; satellite antenna 115; satellite 120; gateway system 125; satellite gateway antenna 130; and network 135.

Terminal 110 may be any form of device that communicates with gateway system 125 via a bidirectional satellite communication link. Terminal 110 may be a computerized device such as a computer, laptop, gaming system, or television system. In some embodiments, terminal 110 is an access point (AP) that allows one or more computerized devices to communicate with gateway system 125 via terminal 110. For instance, terminal 110 may be an access point on a train, ship, airplane, or a mobile or fixed wired or wireless network.

Satellite antenna 115 may be capable of transmitting signals to satellite 120 and receiving signals from satellite 120. Wireless signal 140 can represent an uplink signal that is transmitted by satellite antenna 115 along the return path to satellite 120. Wireless signal 140 can also represent a downlink signal from satellite 120 to satellite antenna 115. Satellite antenna 115 is in communication with terminal 110 such that terminal 110 can transmit signals to satellite antenna 115 for transmission and receive signals from satellite antenna 115.

Satellite 120 may be low earth orbit (LEO), middle earth orbit (MEO), or geosynchronous earth orbit (GEO). If in LEO or MEO, satellite 120 may move in and out of communication range with satellite antenna 115 (and satellite gateway antenna 130), one or more additional satellites may have different orbits that allow such additional satellites to serve as the relay in the communication link between satellite antenna 115 and satellite gateway antenna 130 when satellite 120 is out of range.

Satellite 120 can communicate with gateway system 125 via satellite gateway antenna 130. Wireless signal 145 can represent a signal transmitted from satellite gateway antenna 130 to satellite 120 or a signal transmitted from satellite 120 to satellite gateway antenna 130. Satellite 120 may serve to relay transmissions between terminal 110 and gateway system 125 with little or no processing performed on such signals by satellite 120. Satellite 120 may alter the frequency at which the signals are relayed between terminal 110 and gateway system 125.

Gateway system 125 may perform multiple functions. Gateway system 125 may analyze data and provide instructions and feedback to terminal 110. Gateway system 125 may analyze the received power or signal strength of data signal 150 transmitted by satellite antenna 115 to satellite 120. Power measurement 152 may be indicative of the carrier to noise ratio (or some other indication of received power or signal strength) received by satellite 120 on a return channel signal from satellite antenna 115. Power measurement 152 may be transmitted by gateway system 125 as a separate or part of a later (e.g., next) message transmitted to terminal 110. Gateway system 125 may not perform any processing on power measurement 152, but rather may simply relay power measurement 152 to terminal 110. In some embodiments, power measurement 152 is made by satellite 120, in other embodiments, power measurement 152 is made by gateway system 125. In some embodiments, it may be possible for satellite 120 to perform the power measurement and transmit the power measurement to terminal 110 without requiring participation of gateway system 125.

An additional function of gateway system 125 can be to serve as an intermediary between terminal 110 and network 135. Network 135 may include one or more public and/or private networks. For instance, network 135 may include a private network that terminal 110 is permitted to access. Network 135 may include the Internet. Therefore, terminal 110 may use gateway system 125 for internet access via satellite 120.

Terminal 110 may be configured, as detailed in relation to FIGS. 2-5, to change modulation and error correction coding rate (e.g., forward error correction or FEC). Such a change in modulation may be applied to a future data signal 154. Data signal 154 may be transmitted by terminal 110 via satellite antenna 115 to satellite 120 after power measurement 152 has been received and processed by terminal 110. The modulation and error correction coding rate, may be selected by terminal 110 based on stored data received from gateway system 125 and power measurement 152.

Figure 2:
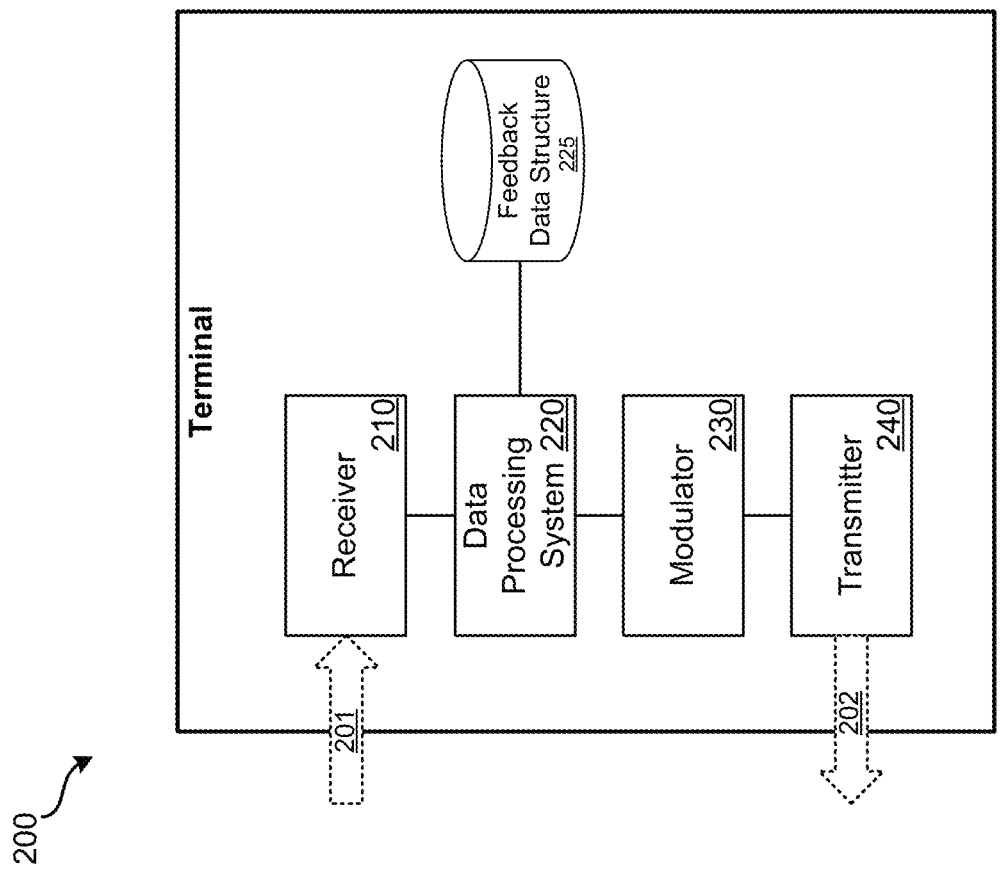
FIG. 2 illustrates an embodiment of a terminal used to modulate data signals to be transmitted to the gateway via the satellite.

FIG. 2 illustrates an embodiment of terminal 200 used to modulate data signals to be transmitted to the gateway via the satellite. Terminal 200 can represent an embodiment of terminal 110 of FIG. 1. Terminal 200 can include: receiver 210; data processing system 220; feedback data structure 225; modulator 230; and transmitter 240. Receiver 210 may receive signal 201. Signal 201 may be received from satellite antenna 115. Signal 201 may include a power measurement, such as power measurement 152. Receiver 210 may decode and/or demodulate signal 201 and transmit the modified signal to data processing system 220. Data processing system 220 may include one or more processors. Such processors may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

Data processing system 220 may have access to a non-transitory processor readable medium that stores feedback data structure 225. Feedback data structure 225 may be in the form of a table, a database, or some other form of data structure. Feedback data structure 225 may be queried by data processing system 220. Data processing system 220 may use a received power measurement, such as power measurement 152, or some value calculated using power measurement 152 (e.g., an average of multiple power measurements) to query feedback data structure 225. Further detail regarding embodiments of the structure of feedback data structure 225 is provided in relation to FIG. 3. Feedback data structure 225 may be periodically or occasionally updated based on data received via receiver 210 from a gateway system, such as gateway system 125.

Once data processing system 220 has accessed feedback data structure 225 to determine a type of modulation to be used and/or an error correction coding rate to be used, data processing system 220 may begin using the identified error correction coding rate to encode data packets to be transmitted to the satellite. Data processing system 220 can communicate with modulator 230. Modulator 230 may be an integrated circuit that is distinct from data processing system 220 or integrated as part of data processing system 220. Data processing system 220 may transmit a message to modulator 230 that indicates the type of modulation that should be used for the data packets. In some embodiments, modulator 230 may be able to determine the type of modulation to use based on the structure of the data packets output by data processing system 220 to modulator 230. In other embodiments, a separate message or signal may be provided by data processing system 220 to modulator 230 indicative of the type of modulation to be used. Modulator 230 may be a dedicated piece of hardware of terminal 200 distinct from data processing system 220. In some embodiments, modulation may be performed directly by data processing system 220.

In some embodiments, modulator 230 may construct a header (e.g., burst packet header). The header can use a fixed modulation (and fixed error correction code rate) and may be transmitted ahead of the data packets being encoded by modulator 230. Since the modulation (and error correction code rate) is fixed, this modulation and/or error correction code rate can differ from the modulation and/or error correction code rate of the data packets. The header can include information that indicates the type of modulation and the error correction code rate that is used for the data packets. Therefore, by a gateway system processing the packet header, the header can be used to determine the correct type of demodulation to be performed (and the correct error correction coding). Further detail regarding the use of such a header is provided in U.S. Pat. No. 9,941,952, entitled "Inroute burst header in a VSAT system," the entire disclosure of which is hereby incorporated by reference for all purposes. Modulator 230 may pass the modulated data signal and header to transmitter 240. Transmitter 240 may output data signal 202 for transmission. Data signal 202 may be sent to satellite antenna 115 for transmission to satellite 120.

FIG. 3 illustrates an embodiment of a table 300 stored by the terminal to select a type of modulation, an error-correcting coding rate, or both. Table 300 can be stored as part of feedback data structure 225. Table 300 represents a lookup table that corresponds to symbol rate 310. Table 300 may only be used when the currently set symbol rate, which defines the number of symbols to be transmitted per second, is set to a particular value. In the example of table 300, the symbol rate is 512 ksps.

Assuming that the terminal is already transmitting using a symbol rate of 512 ksps, table 300 may be used to determine a type of modulation and error correcting code rate to use for future data signal transmissions. Using a received power measurement or a value calculated using one or more received power measurements, a lookup may be performed using table 300. The lookup may be performed based on column 340. Column 340 can indicate a minimum carrier to noise value needed in order to use the type of modulation and code rate for a particular entry. Rows within table 300 may be ranked based on the total throughput per slot, as indicated in column 345. That is, a goal may be to use the type of modulation and the error correcting code that provides the most throughput. Therefore, the higher ranked entry within table 300 that is used to select the type of modulation and the error correcting code rate, the more data that can be transmitted from the terminal to the satellite on the return channel.

When table 300 is queried, the received power measurement or value calculated using one or more received power measurements may be compared to column 340. In some embodiments, an entry is determined for which the received power measurement is greater than the value (e.g., carrier-to-noise value) of column 340, but that for a next higher ranked entry, the received power measurement is not greater than the corresponding value in column 340. For example, column 340 can be evaluated for a value of 69.5. Since 69.5 is greater than the value of 69.3 in column 340 for entry 352 but is less than the value of 70.0 in the next higher ranked entry, entry 352 would be selected in response to the query. Entry 352 is mapped to a modulation type indicated in column 320 and an error correcting code rate indicated in column 330. Therefore, since entry 352 was selected based on the query, "8PSK" and an error correcting code rate of 4/5. This error correcting code rate corresponds to four data bits in every five symbols—thus, one symbol is used for error correction.

It should be noted that in table 300, the type of modulation can vary between different types. For instance, because a first type of modulation happens to allow for a better throughput with a particular code rate at a first power level, a second type of modulation may allow for better throughput at a same or different code rate at a second, lower power level. Further, at a third power level, the first type of modulation may again be the most efficient when paired with a different code rate. As a specific example of this, for entry 350, "16APSK" is mapped as the type of modulation. For lower-ranked entry 352, the type of modulation is "8PSK." For a still lower-ranked entry 354, "16APSK" is again used as the modulation, with a different code rate than entry 350. As can be seen in table 300, entries are ranked by data throughput: entry 350 has a throughput of 7111; entry 352 has a throughput of 6400; and entry 354 has a throughput of 5333.

Each transition between different types of modulations and code rates within table 300 may be performed without: 1) the terminal asking for permission from the satellite or gateway system; and 2) changing channel. However, if the terminal needs to transition to a different symbol rate, the terminal may need to change channel and/or request permission from the gateway system. A different symbol rate may be used if: 1) the received power level does not exceed any value in column 340; or 2) the received power level is a threshold level above the highest ranked entry in column 340. If such a change is necessary, a different table stored as part of feedback data structure 225 may be used to select a symbol rate, type of modulation, and/or error correcting code rate. Changing symbol rate may include sending a request to the gateway system using a separate ALOHA communication channel. Therefore, feedback data structure 225 may store multiple tables for different symbol rates. In other embodiments, only a single table (or other form of data structure) may be stored for all symbol rates, but such a table may be filtered based on the symbol rate currently being used. Therefore, if the current symbol rate is eligible to continue being used, it will be. Changing symbol rate may be avoided if possible to prevent having to change channel and, possibly, make a request to the gateway system; such additional steps can significantly delay the transmission of data signals.

Figure 4:
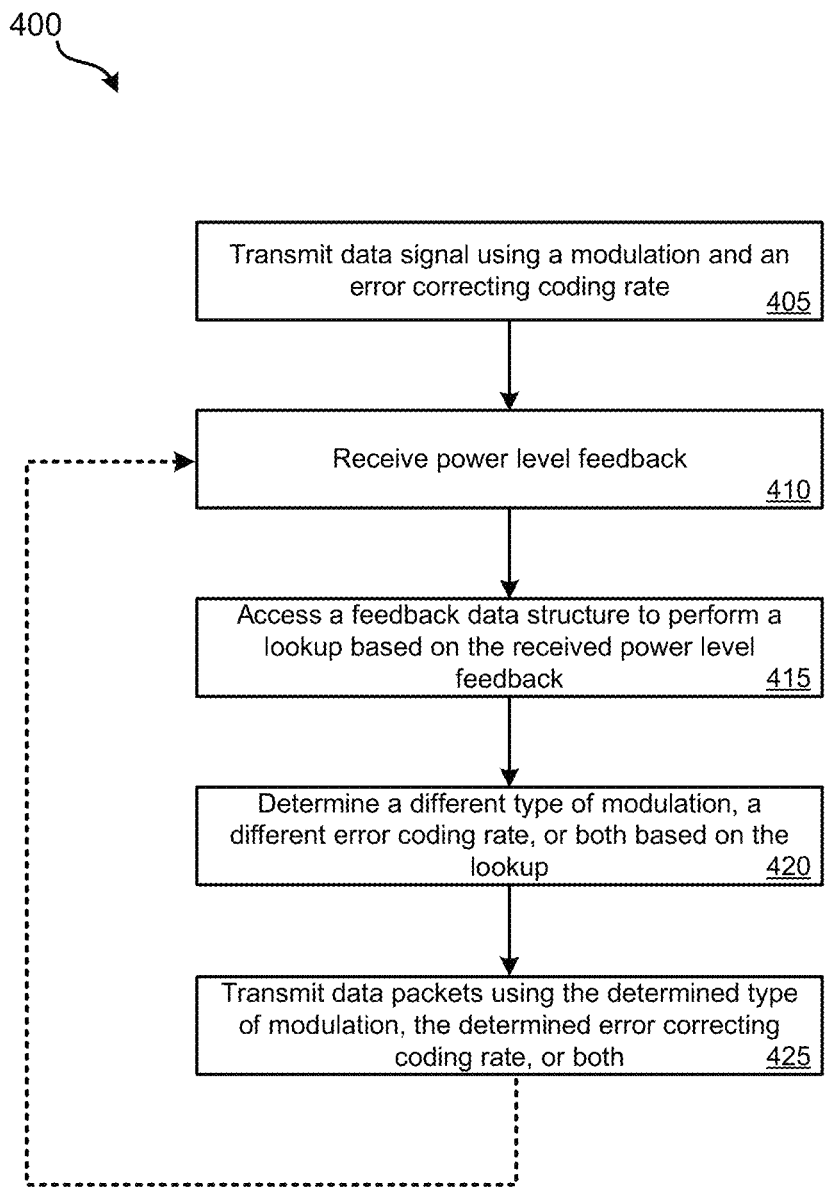
FIG. 4 illustrates an embodiment of a method for selecting and changing the type of modulation used to transmit data signals to the satellite.

Various methods may be performed using the systems, devices, and data storage arrangements of FIGS. 1-3. FIG. 4 illustrates an embodiment of a method 400 for selecting and changing the type of modulation used to transmit data signals to the satellite. Method 400 may be performed using system 100. More specifically, each step of method 400 may be performed by a terminal device, such as terminal 110 of FIG. 1 or terminal 200 of FIG. 2. At block 405, a data signal is transmitted by the terminal device via a satellite antenna to a satellite using a type of modulation and an error correcting code rate. The type of modulation and an error correcting code rate may have been selected by the terminal based on previous feedback from the satellite or gateway system via the satellite. Alternatively, the first type of modulation and error correcting code rate may have been a default modulation and error correcting code that is used by the terminal, such as following a terminal reset or during an initial configuration.

At block 410, a message containing an indication of the power level of the data signal transmitted by the terminal's satellite antenna to the satellite may be received. The power level may be measured by the satellite or may be measured by the gateway device. Therefore, the power level measurement is indicative of the amount of signal power successfully received by the satellite (or the gateway device) of the transmitted data signal. An indication of the measured power level may be transmitted to the terminal device in a subsequent or later message. The power level measurement may be based on a single measurement or may be an average or median value (or some form of combined value) calculated using multiple power level measurements. In some embodiments, multiple power level feedback values may be received by the terminal and combined together (e.g., via averaging, finding a median, etc.).

At block 415, a feedback data structure may be accessed to perform a lookup based on the received power level feedback. The power level feedback value or a value calculated based on multiple power level feedback values may be used to access and perform a query in a feedback data structure at block 415. The query may be additionally based on the current symbol rate being used. The query may be used to search a particular table or a table may be filtered based on the current symbol rate. As long as a result is successfully determined having the current symbol rate, the symbol rate may not be changed. Once an entry is located that successfully matches the power level feedback value or a value calculated based on multiple power level feedback values, the entry's type of modulation and error correcting code rate may be determined to be used to encode and modulate future data packets to be transmitted to the satellite via the return path at block 420. This determined type of modulation, the error correcting code rate, or both can differ from the type of modulation and the error correcting coding rate used for the transmission of block 405. However, since the measured power level may not be expected to vary frequently, the type of modulation, the error correcting code rate, or both may match the type of modulation and the error correcting coding rate used for the transmission of block 405 during at least some iterations of method 400.

At block 425, one or more data signals that can include data packets may be transmitted using the determined type of modulation and the determined error correcting code rate. Between block 405 and block 425, the terminal does not send a request to change the modulation type or the error correcting code rate to the satellite or to the gateway system via the satellite. Further, the terminal does not change channel; that is, the transmissions of block 405 and block 425 can be performed on the same channel despite the modulation, error correcting code rate, or both being different. Therefore, the transmission of data signals or data packets at block 425 can be understood as "on-the-fly" because the terminal does not need to stop transmitting data, change channel, or request permission to change the type of modulation used.

Figure 5:
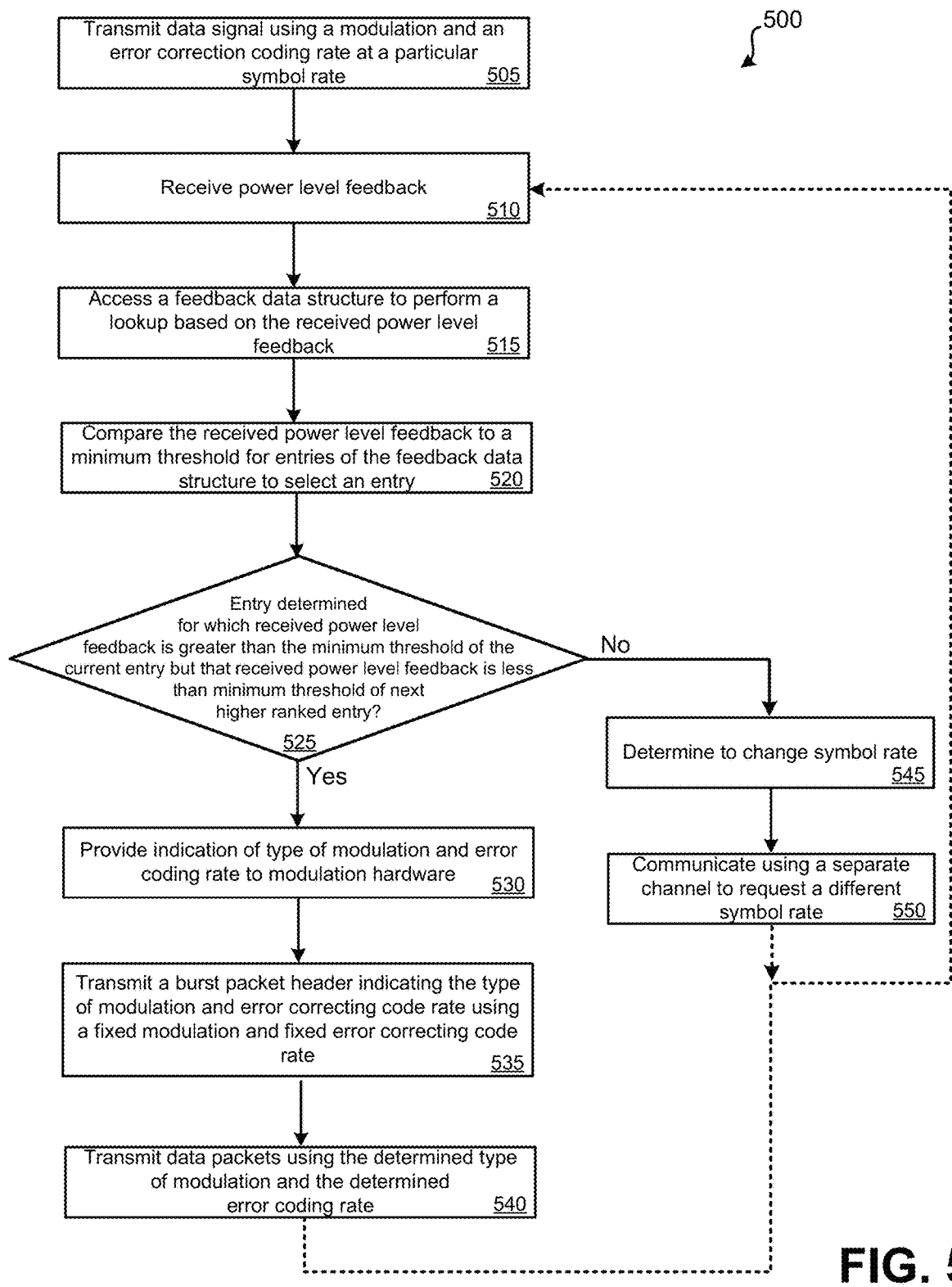
FIG. 5 illustrates another embodiment of a method for selecting and changing the type of modulation used to transmit data signals to the satellite.

FIG. 5 illustrates another embodiment of a method 500 for selecting and changing the type of modulation used to transmit data signals to the satellite. Method 500 can represent a more detailed embodiment of method 400. Method 500 may be performed using system 100. More specifically, each step of method 500 may be performed by a terminal device, such as terminal 110 of FIG. 1 or terminal 200 of FIG. 2. At block 505, a data signal is transmitted by the terminal device via a satellite antenna to a satellite using a type of modulation and an error correcting code rate. The type of modulation and an error correcting code rate may have been selected by the terminal based on previous feedback from the satellite or gateway system via the satellite. Alternatively, the first type of modulation and error correcting code rate may have been a default modulation and error correcting code that is used by the terminal, such as following a terminal reset or during an initial configuration.

At block 510, a message containing an indication of the power level of the data signal transmitted by the terminal's satellite antenna to the satellite may be received. The power level may be measured by the satellite or may be measured by the gateway device. Therefore, the power level measurement is indicative of the amount of signal power successfully received by the satellite (or the gateway device) of the transmitted data signal. An indication of the measured power level may be transmitted to the terminal device in a subsequent or later message. The power level measurement may be based on a single measurement or may be an average or median value (or some form of combined value) calculated using multiple power level measurements. In some embodiments, multiple power level feedback values may be received by the terminal and combined together (e.g., via averaging, finding a median, etc.).

At block 515, a feedback data structure may be accessed to perform a lookup based on the received power level feedback. The power level feedback value or a value calculated based on multiple power level feedback values may be used to access and perform a query in a feedback data structure at block 515. The query may be additionally based on the current symbol rate being used. The query may be used to search a particular table or a table may be filtered based on the current symbol rate. As long as a result is successfully determined having the current symbol rate, the symbol rate may not be changed.

At block 520, the feedback structure may be searched using the received power level feedback (or a value calculated from the received power level feedback). The feedback structure may only be searched for entries that correspond to the same symbol rate at used at block 505. For instance, a particular table may be mapped to a particular symbol rate. Alternatively, a master table that is used for multiple symbol rates may be filtered based on symbol rate. Alternatively, entries associated with a different symbol rate may be ignored. The comparison of block 520 can involve identifying an entry for which the received power level feedback (or a value calculated from the received power level feedback) is greater than a specified minimum power level (e.g., carrier to noise ratio) indicated in the entry. The comparison can further involve determining that the received power level feedback (or a value calculated from the received power level feedback) is not greater than the specified minimum power level indicated in a next-higher ranked entry. Therefore, the highest ranked entry (e.g., the entry with the highest data throughput) is identified for which the received power level is greater than the entry's specified minimum power level. Such an arrangement allows for the type of modulation and the error correcting code rate to be used that allows for the greatest data throughput for the received power level.

At block 525, a determination is made by the terminal as to whether an entry has been successfully identified for which the received power level feedback (or a value calculated from the received power level feedback) is greater than the entry's minimum power level feedback but that the received power level feedback is less than the minimum threshold of a next-higher ranked entry. If the determination is yes, method proceeds to block 530. If the error correcting code rate is also changed, the data processing system may output packets to modulator 230 that include the correct ratio and order of data packets to error correcting packets.

For a given symbol rate, if the highest-ranked entry of the table is already in use, a determination may be made by the terminal whether to: 1) stay at the current symbol rate and continue using the highest-ranked entry (so that uplink communication can continue without interruption and requesting a higher symbol rate); or 2) the terminal may proceed with interrupting uplink communications, and request and change to a higher symbol rate. The terminal may be programmed to select based on one or more factors used to determine whether to change symbol rates or continue using the current symbol rate. Which option is selected may be based on whether the terminal is currently configured to prioritize continuity of the data transfer or to maximize the data throughput rate.

At block 530, an indication of the type of modulation is provided to the modulation hardware of the terminal. Block 530 can involve a message or signal being sent to the modulator. Alternatively, the modulator may be able to sense what type of modulation should be used based on the output content of a data signal.

At block 535, the terminal, or, more specifically, the modulator may transmit a header, such as a burst packet header, that indicates the type of modulation and the error correcting code rate that was selected at block 520. The header can be transmitted using a predetermined fixed modulation and a predetermined fixed error correcting code rate. Therefore, burst packet headers can always be transmitted using a particular modulation, error correcting code rate, or both.

At block 540, one or more data signals that can include data packets may be transmitted using the determined type of modulation and the determined error correcting code rate. Between block 505 and block 540, the terminal does not send a request to change the modulation type or the error correcting code rate to the satellite or to the gateway system via the satellite. Further, the terminal does not change channel; that is, the transmissions of block 505 and block 540 are performed on the same channel despite the modulation, error correcting code rate, or both being different. Therefore, the transmission of data signals or data packets at block 540 can be understood as "on-the-fly" because the terminal does not need to stop transmitting data, change channel, or request permission to change the type of modulation used.

If the determination of block 525 is no, method proceeds to block 545. At block 545, a determination may be made to change symbol rate. In some embodiments, the terminal also determines a new symbol rate. The new symbol rate can be determined based on the received power level feedback. For instance, the next lower symbol rate may be selected if the received power level feedback does not meet any minimum power level thresholds of a currently-active table evaluated at block 515; the next higher symbol rate may be selected if the received power level feedback is above all of the minimum power level threshold of the currently-active table evaluated at block 515.

At block 550, on a separate channel, the terminal may transmit a request to the gateway system via the satellite that requests a change in symbol rate and/or channel. The request may be transmitted using the separate channel and an aloha communication method. In some embodiments, the request can indicate the terminal (e.g., an address of the terminal) and, possibly, the requested channel and/or symbol rate. In some embodiments, the gateway system may specify in a response the new channel to be used, the new symbol rate, or may provide permission for the terminal to switch to a requested channel, requested symbol rate, or both.

Following blocks 540 or 550, method 500 can be repeated continuously as feedback is received for additional transmitted bursts to determine if the current symbol rate, type of modulation, error correcting code rate, or some combination thereof needs to be changed.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for adaptive modulation of terminal to satellite communications, the method comprising:
   receiving, by a terminal, power level feedback from a satellite, wherein the power level feedback is indicative of a received power level of a data transmission previously sent from the terminal to the satellite;
   accessing, by the terminal, a feedback data structure to perform a lookup based on the received power level, wherein:
     the feedback data structure maps a plurality of error correcting code rates with a plurality of minimum power level thresholds;
     the feedback data structure comprises a plurality of entries;
     each entry of the plurality of entries maps one of the plurality of error coding rates with one of the plurality of minimum power level thresholds;
     the plurality of entries of the feedback data structure are ranked according to the plurality of minimum power level thresholds; and
     each of the plurality of minimum power level thresholds are mapped to a same symbol rate;
   based on performing the lookup based on the received power level in the feedback data structure, determining, by the terminal, the received power level is not greater than any of the plurality of minimum power level thresholds;
   determining, by the terminal, to decrease a symbol rate in response to determining that the received power level is not greater than any of the plurality of minimum power level thresholds; and
   transmitting, by the terminal, data packets to the satellite using a decreased symbol rate in response to determining that the received power level is not greater than any of the plurality of minimum power level thresholds mapped to the same symbol rate.

2. The method for adaptive modulation of terminal to satellite communications of claim 1, wherein the feedback data structure further maps the plurality of minimum power level thresholds to a plurality of types of modulation.

3. The method for adaptive modulation of terminal to satellite communications of claim 1, wherein determining the error correcting coding rate further comprises:

selecting, by the terminal, an entry from the plurality of entries based on the power level feedback being greater than a first minimum power level threshold of the entry but the power level feedback being less than a second minimum power level threshold of a next higher ranked entry.

4. The method for adaptive modulation of terminal to satellite communications of claim 3, wherein the plurality of entries are interspersed such that one error coding rate of the plurality of error coding rates is mapped to a first entry having a higher rank than a second entry mapped to a second error coding rate of the plurality of error coding rates and the one error coding rate is mapped to a third entry having a lower rank than the second entry mapped to the second error coding rate.

5. The method for adaptive modulation of terminal to satellite communications of claim 1, the method further comprising:
prior to transmitting data packets to the satellite using the determined error correcting coding rate, transmitting, by the terminal, a burst packet header that indicates the determined error correcting coding rate.

6. The method for adaptive modulation of terminal to satellite communications of claim 5, wherein the burst packet header is transmitted using a fixed modulation and fixed code rate that is unchanging in relation to a type of modulation used for modulation of the data packets.

7. The method for adaptive modulation of terminal to satellite communications of claim 6, further comprising:
creating, by the terminal, the data packets to the satellite using the determined error correcting code rate.

8. The method for adaptive modulation of terminal to satellite communications of claim 1, further comprising:
transmitting, by the terminal to the satellite, a request to change the symbol rate on a channel designated for aloha random access.

9. A system that performs adaptive modulation of terminal to satellite communications, the system comprising:
a terminal that is in communication with a gateway system via a satellite and a satellite antenna, wherein the terminal comprises one or more non-transitory processor-readable mediums and the terminal is configured to:
receive power level feedback from the satellite, wherein the power level feedback is indicative of a received power level of a data transmission previously sent from the terminal to the satellite;
access a feedback data structure stored using the one or more non-transitory processor-readable mediums to perform a lookup based on the received power level, wherein:
the feedback data structure maps a plurality of error correcting code rates with a plurality of minimum power level thresholds;
the feedback data structure comprises a plurality of entries;
each entry of the plurality of entries maps one of the plurality of error coding rates with one of the plurality of minimum power level thresholds;
the plurality of entries of the feedback data structure are ranked according to the plurality of minimum power level thresholds; and
each of the plurality of minimum power level thresholds are mapped to a same symbol rate;
based on performing the lookup based on the received power level in the feedback data structure, determine the received power level is not greater than any of the plurality of minimum power level thresholds;
determine to decrease a symbol rate in response to determining that the received power level is not greater than any of the plurality of minimum power level thresholds; and
transmit data packets to the satellite using a decreased symbol rate in response to determining that the received power level is not greater than any of the plurality of minimum power level thresholds mapped to the same symbol rate.

10. The system that performs adaptive modulation of terminal to satellite communications of claim 9, further comprising the satellite, wherein the satellite relays communications between the terminal and the gateway system.

11. The system that performs adaptive modulation of terminal to satellite communications of claim 10, further comprising the gateway system, wherein the gateway system determines the power level feedback and transmits the power level feedback to the satellite.

12. The system that performs adaptive modulation of terminal to satellite communications of claim 9, wherein the feedback data structure maps the plurality of minimum power level thresholds to a plurality of types of modulation.

13. The system that performs adaptive modulation of terminal to satellite communications of claim 9, wherein the terminal being configured to determine the type of modulation comprises the terminal being configured to:
select an entry from the plurality of entries based on the power level feedback being greater than a first minimum power level threshold of the entry but the power level feedback being less than a second minimum power level threshold of a next higher ranked entry.

14. The system that performs adaptive modulation of terminal to satellite communications of claim 13, wherein:
the plurality of entries are interspersed such that one error correcting code rate of the plurality of error correcting code rates is mapped to a first entry having a higher rank than a second entry mapped to a second error correcting code rate of the plurality of error correcting code rates and the one error correcting code rate is mapped to a third entry having a lower rank than the second entry mapped to the second error correcting code rate.

15. The system that performs adaptive modulation of terminal to satellite communications of claim 9, wherein the terminal is further configured to:
transmit a burst packet header that indicates the error correcting coding rate to use for transmitting data packets to the satellite.

* * * * *